(12) United States Patent
Louda

(10) Patent No.: US 6,543,865 B1
(45) Date of Patent: Apr. 8, 2003

(54) DISPLAY CASE WITH A VARIABLE BASE OF THE RESULTING FRAME

(75) Inventor: Jan Louda, Nad Lomem 33, 147 00 Prague 4 (CZ)

(73) Assignees: Till Heinrich Hahn (DE); Jan Louda (CZ)

( * ) Notice: Subject to any disclaimer, the term of this patent is extended or adjusted under 35 U.S.C. 154(b) by 0 days.

(21) Appl. No.: 09/594,642

(22) Filed: Jun. 15, 2000

Related U.S. Application Data

(63) Continuation of application No. PCT/CZ98/00049, filed on Dec. 10, 1998.

(30) Foreign Application Priority Data

Dec. 15, 1997 (CZ) .............................................. 4022-97

(51) Int. Cl.$^7$ ................................................. A47F 3/12
(52) U.S. Cl. ...................................... 312/114; 312/140
(58) Field of Search .................... 49/463, 211; 312/114, 312/140, 107, 108, 109, 111, 257.1, 263, 265.1, 265.2, 265.3, 265.4, 138.1, 349

(56) References Cited

U.S. PATENT DOCUMENTS

| | | | | |
|---|---|---|---|---|
| 3,600,052 A | * | 8/1971 | Marateck | 312/263 |
| 4,368,936 A | * | 1/1983 | Worrallo | 312/257.1 |
| 4,689,929 A | * | 9/1987 | Wright | |
| 5,069,512 A | * | 12/1991 | Sykes | 312/139.2 |
| 5,524,977 A | * | 6/1996 | Orawski | 312/114 |
| 6,052,944 A | | 4/2000 | Louda | |
| 6,113,198 A | * | 9/2000 | Hommes | 312/114 |

FOREIGN PATENT DOCUMENTS

| | | | |
|---|---|---|---|
| DE | 93 13 783.4 | 2/1994 | |
| DE | 295 03 686.9 | 6/1995 | |
| GB | 991047 | * 5/1965 | 312/140 |

* cited by examiner

*Primary Examiner*—Janet M. Wilkens
(74) *Attorney, Agent, or Firm*—Burns, Doane, Swecker & Mathis, LLP

(57) ABSTRACT

A display case includes at least two adjacent modules. Each of the modules includes an upper frame support and lower frame support. Each of the frame supports include carrying frame sections and corner connecting members. The carrying frame members are adapted to be rigidly connected to the corner connecting members. At least one intermodule connecting member interconnects adjacent modules. The at least one intermodule connecting member is adapted to be rigidly connected to the corner connecting members of the adjacent modules. The corner connecting members are formed as prisms and have grooves on vertical surfaces for engagement with protrusions contained on the carrying frame sections or the at least one intermodule connecting member. At least one glass panel is disposed between each upper frame support and lower frame support of the adjacent modules on the carrying frame sections wherein only one vertical side edge of one of the at least one glass panel is fitted with a seal which is in contact with the other of the at least one glass panel.

9 Claims, 9 Drawing Sheets

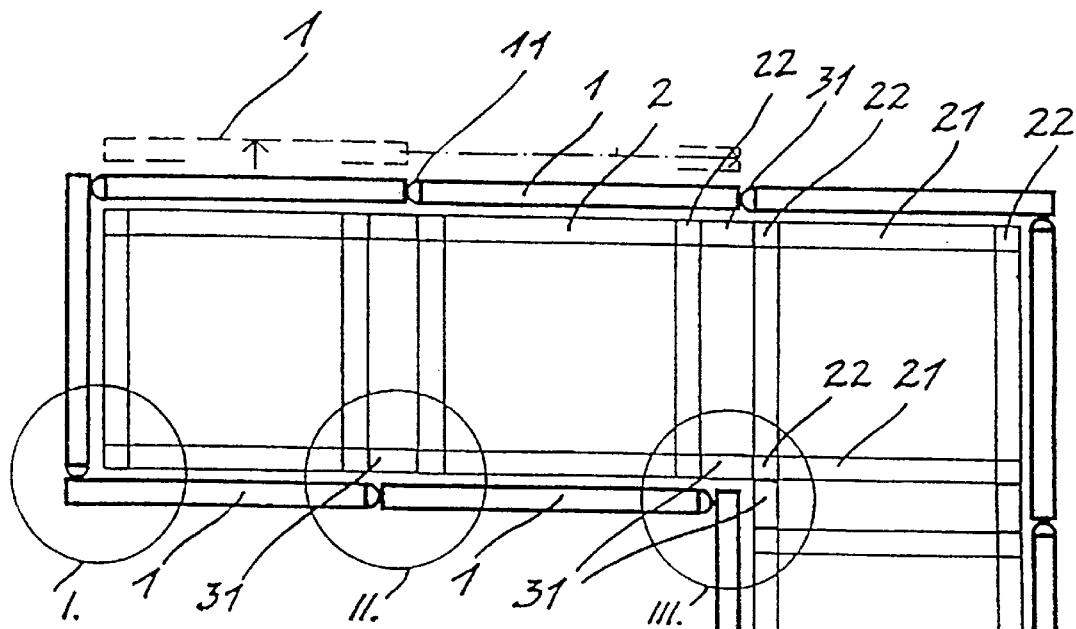
Fig. 3
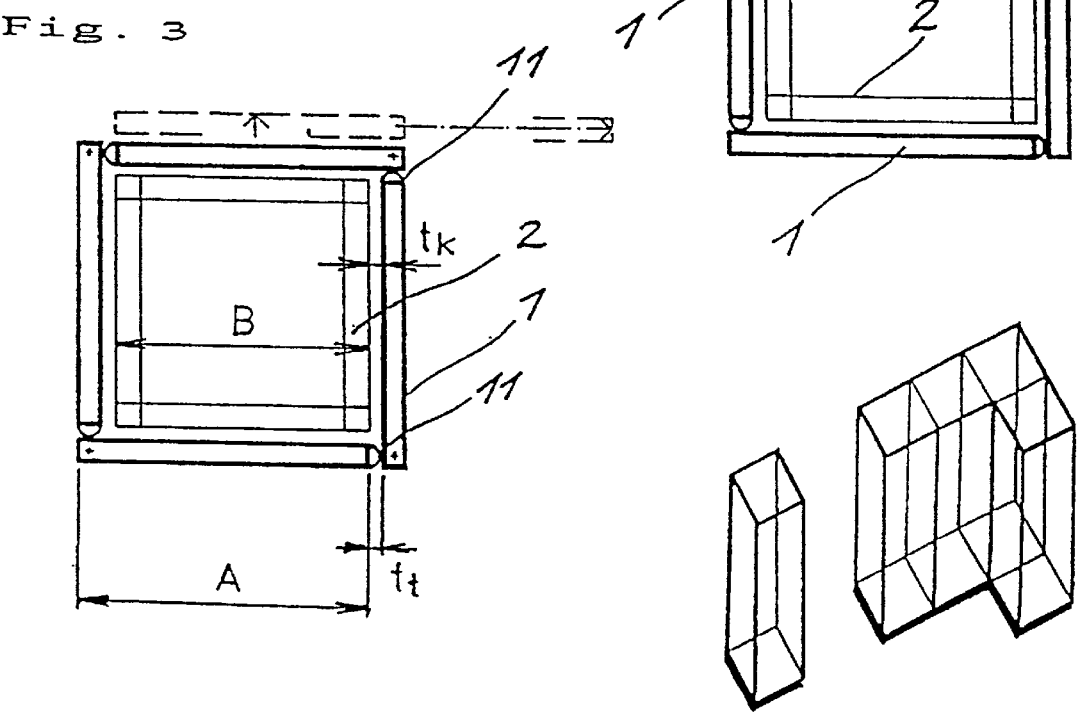
Fig. 2
Fig. 2a   Fig. 3a

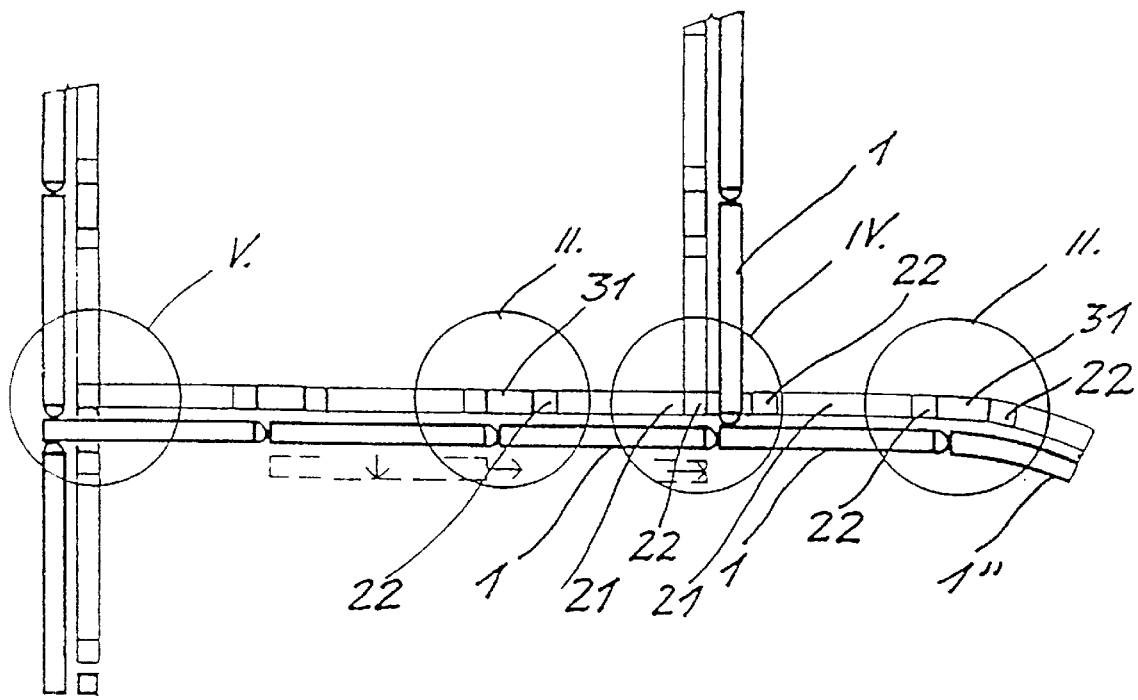
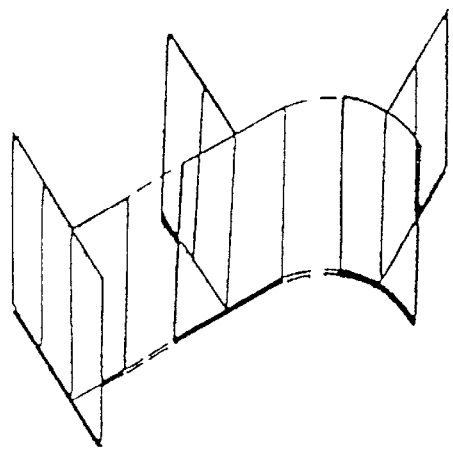
Fig. 8
Fig. 8a

DISPLAY CASE WITH A VARIABLE BASE OF THE RESULTING FRAME

This application is a continuation of PCT/CZ98/00049 filed Dec. 10, 1998.

FIELD OF THE INVENTION

The invention concerns integrally glazed display case assemblies with a variable base of the resulting frame, which is pillarless and dustproof. Such display case assemblies are used above all for exhibition and museum purposes.

BACKGROUND OF THE INVENTION

Commonly used are integrally glazed columnless display case assemblies, composed of glass panels having several various sizes and various edge design and various position of sealings. Such assemblies are characterized by a poor variability and a poor possibility of rearrangment in another configuration.

Known are dismountable assemblies with a possibility of opening individual glass walls (CZ 281944), consisting of frames, whose one part is formed by a carrying section, in which is fitted, with freedom of tilting or shifting, an actuating member, providing for pushing forward of a supporting member, fitted with freedom of sliding on an actuating member. The push-forward supporting member is rigidly fastened to a glass wall. This concept has used several different size glass panels. For each assembly the layout of individual glass panels with defined dimensions, edge cutting pattern and seal position had to be defined in advance. Each of the panels is connected in different ways, depending on its position in the assembly, with a support section, whose form also depends on the position in the whole assembly. From this analysis it becomes apparent that it is difficult to reassemble from one display case assembly another one with a different plane geometry. Also the replacement of individual assembly parts is difficult owing to their various dimensions.

SUMMARY OF THE INVENTION

The disadvantages described above are eliminated by a display case assembly with variable base of the resulting frame, built-up from modules, constituted by an upper and/or by a bottom module frame and by glass panels, consisting according to the invention in that the module is formed by an upper and/or by a bottom module frame and at least by one glass panel, the module frames being interconnected with each other by identical intermodule connecting members to constitute a form of the resulting frame of the display case assembly, module frame is built-up from carrying frame sections and corner connecting members, the carrying frame section being rigidly connected by means of the corner connecting member with an adjacent carrying frame section and/or with an intermodule connecting member, to which is directly connected another corner connecting member with a carrying frame section of an adjacent module, the corner connecting member being a prism fitted on its vertical surfaces with grooves for latching of the head of a lock, which is situated on both ends of the carrying frame section and/or of the intermodule connecting member, the carrying frame section has a form of a prism with a length corresponding to the length of the module frame less the double length of the base of the corner connecting member, the intermodule connecting member has a form of a prism, the glass panels are rectangular, all their side edges are perpendicular to the plane of the glass panel, only one vertical side edge of each glass panel is fitted with a seal, which is in contact with the adjacent glass panel, the upper and/or the bottom edge of the glass panel is connected with the carrying frame section, being a component part of the upper and/or of the bottom resulting frame of the display case assembly.

The side edge of the glass panel fitted with the seal is in contact with the vertical side of an adjacent glass panel or is in contact with a vertical side edge of an adjacent glass panel.

In a display case assembly formed from the modules with a paralellipipedical base the wall width A of the glass panel is preferably determined by the relationship $A = B + T - t_t + 2t_k$, where B is the outer dimension of the module frame in horizontal plane running through the glass panel and the module frame, T the thickness of the glass panel $t_t$ thickness of the seal $t_k$ the design distance between the module frame and the glass panel.

The modules with a rectangular base consist of at least two identical glass panels and at least of two equidimensional carrying frame sections and identical corner connecting members.

The modules with a rectangular base consist of identical vertical glass panels and of equidimensional carrying frame sections and identical corner connecting members.

The modules with a rhombic base consist of identical vertical glass panels and of equidimensional carrying frame sections.

The surface of the glass panel can be curved and such bow-like glass panel is connected with an upper and/or a bottom curved carrying frame section.

The display case assembly can open any of its vertical glazed walls by pushing forward and then by side-shifting of the glass panel over an adjacent vertical glass panel. This can be achieved in that in the carrying frame section on its whole length an actuating section is fitted with freedom of shifting or tilting, on the whole length of which a supporting section is situated with freedom of displacement, said supporting section being rigidly fastened to a displaceable vertical glass panel. The supporting section is pushed out from the carrying frame section and travels sideways with the panel along the adjacent supporting section.

The display case assembly is pillarless and dustproof.

The display case assembly consists of modules, a module having at least one upper or bottom module frame and at least one glass panel. The remaining sides of the module, situated inside the display case assembly, can be free. The module frames are connected with each other by intermodule connecting members. The glass panels are connected with the upper and/or with the bottom carrying frame section, being a component part of the module frame.

The modular system according to the invention permits to get a maximum variability of the display case assembly with a minimized number of various glass panel sizes.

The system of glass panel interconnection according to the invention makes it possible, in the case of module with paralellipipedical base and with a glass panel width A defined by the relationship $A = B + T - t_t + 2t_k$, to assemble highly variable display case assemblies. It enables to assemble from glass panels of identical sizes an inner fillet, an outer corner or a straight wall of a display case assembly.

In the case of a constant module height with a square base only one size of glass panels, carrying frame sections, corner connecting elements and intermodule connecting elements is sufficient.

So it is possible to assemble from an equidimensional carrying frame section, rigidly connected with a glass panel, using a unified corner connecting member and an intermodule connecting member, any display case assembly, composed of modules with a square base. In some versions the module frame inner parts can be completely left out.

It is therefore obvious that the customer can build up from a minimum number of various elements, if only one glass height is used, a display case of any plane geometry. When using carrying frame sections, in which are inserted an actuating section with freedom of shifting or tilting, and a supporting section with rigidly fastened glass panel, any vertical walls of the display case assembly can be opened. The universal character of individual elements enables to easily modify the display case assemblies without the necessity of safeguarding the order and layout of individual walls in the assembly, and to replace readily any glass wall in a given assembly.

SURVEY OF FIGURES

FIG. 2 shows a horizontal sectional view of a square display case module.

FIG. 2a presents an axonometrical view of the square module.

FIG. 3 shows a horizontal sectional view of a display case assembly, composed of square modules with details I, II and III.

FIG. 3a represents an axonometrical view of a display case assembly, composed of square modules.

Figure 3B:
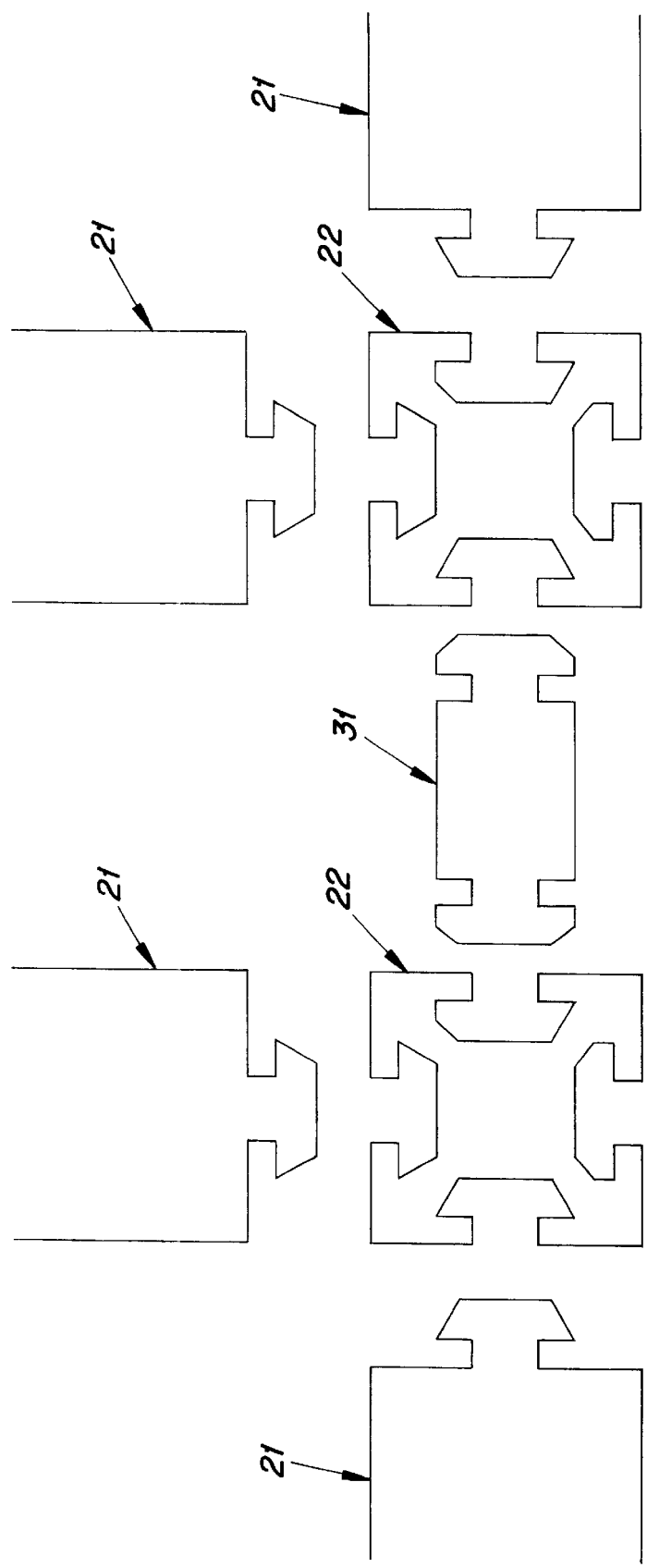

FIG. 3b is a more detailed view of detail II of the display case assembly according to FIG. 3.

Figure 4:
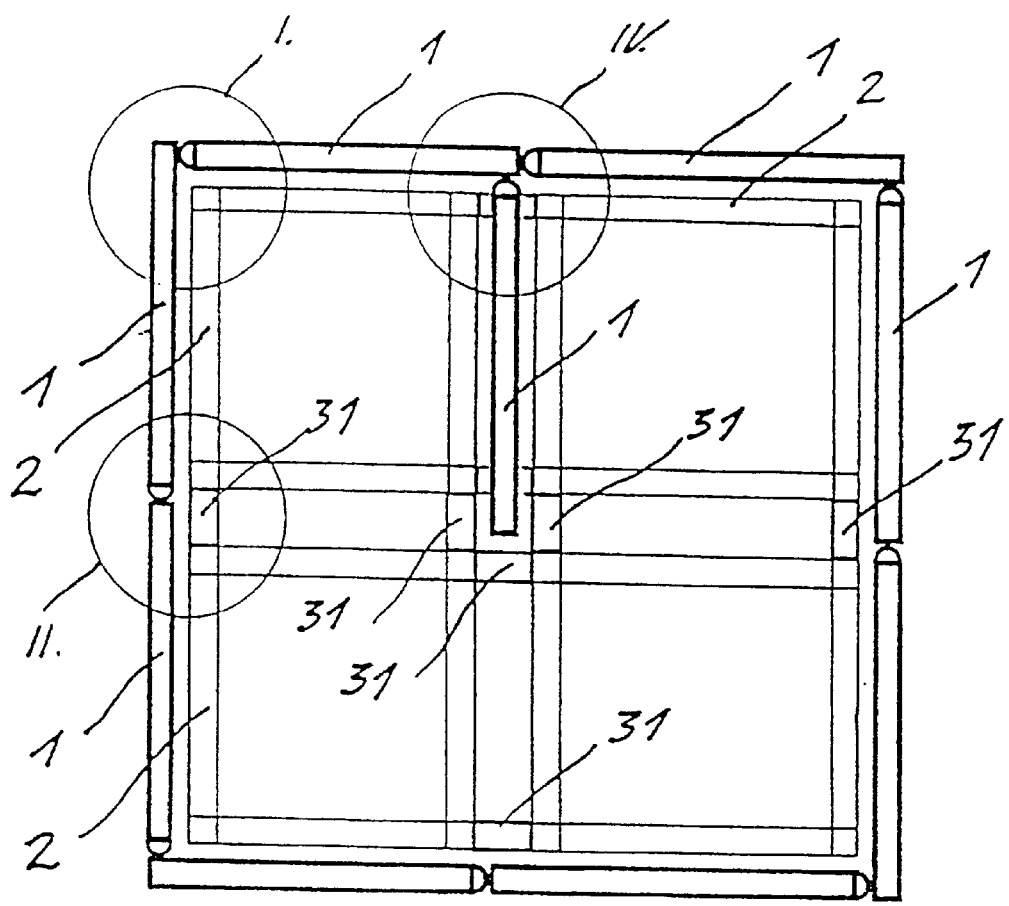

FIG. 4 gives a horizontal sectional view of a four-module assembly with inserted inner glass panel and the details 1, II and IV.

Figure 4A:
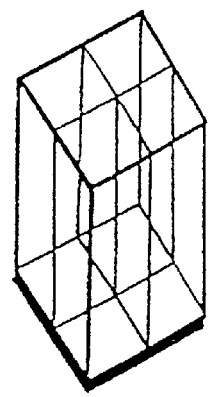

FIG. 4a is an axonometrical view.

Figure 5:
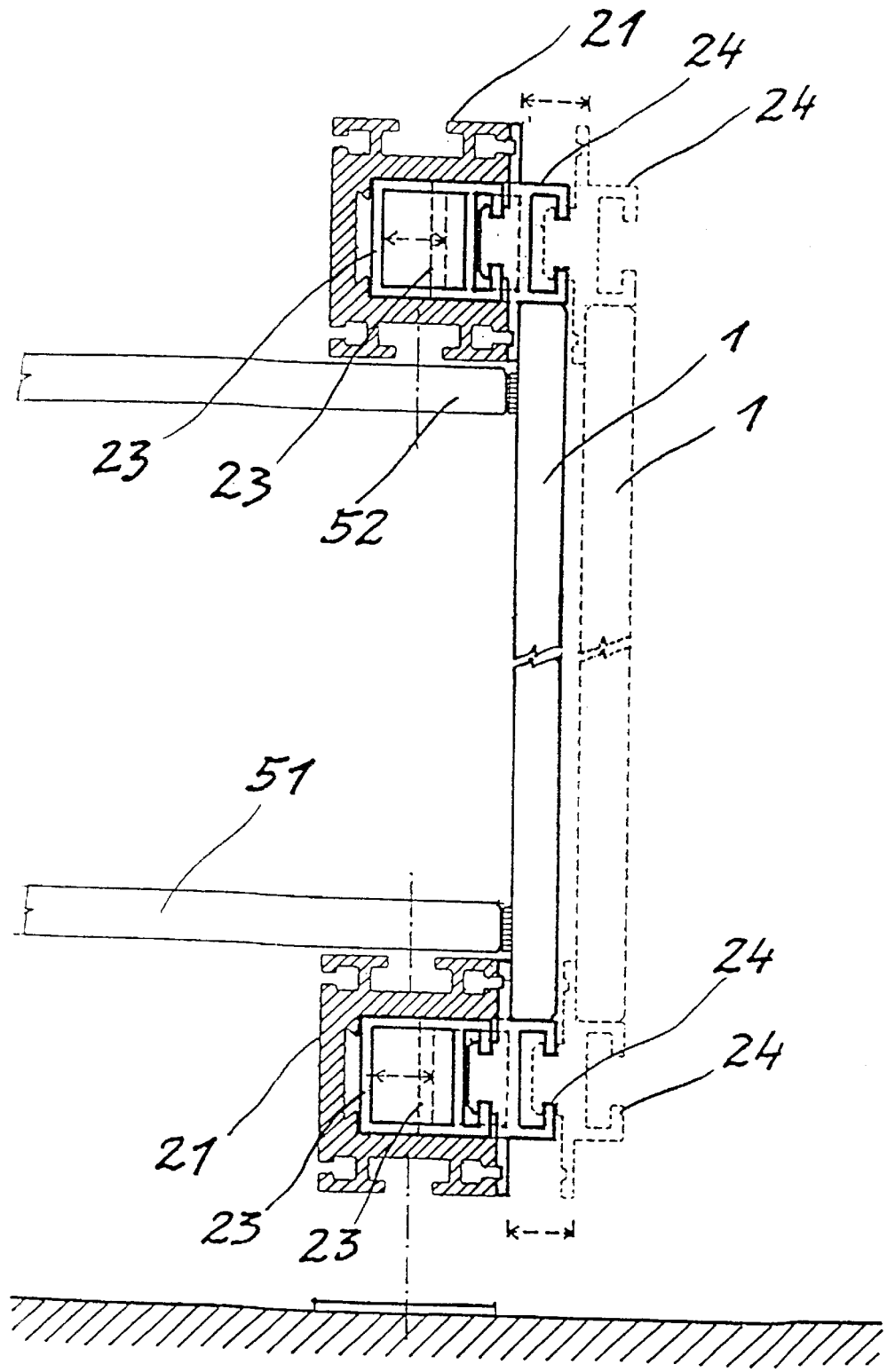

FIG. 5 shows a detail of bonding the glass panel with the carrying frame section.

Figures 6, 6A:
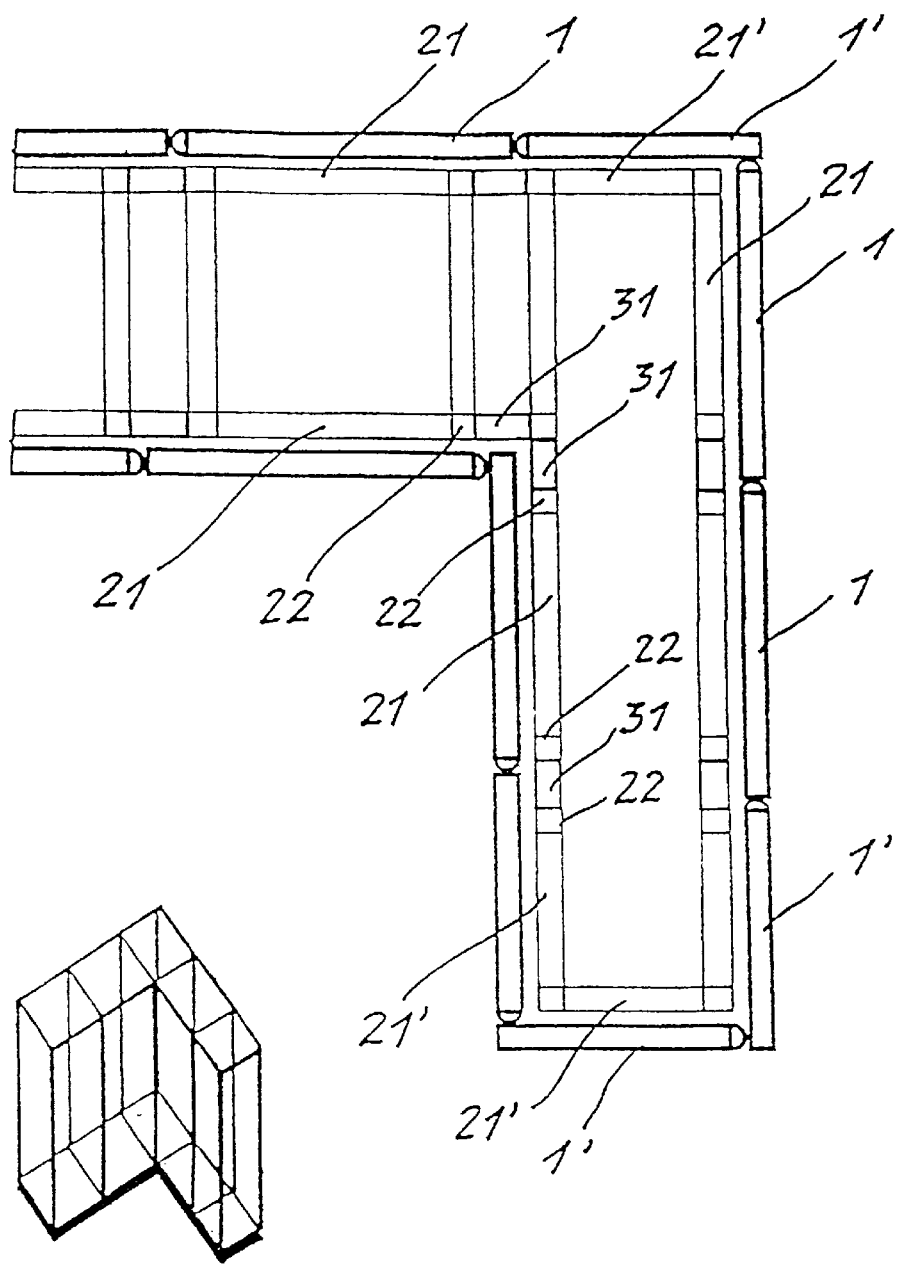

FIG. 6 gives a horizontal sectional view of a display case assembly combined of square and rectangular modules.

FIG. 6a is an axonometrical view of a display case assembly combined of square and rectangular modules.

Figures 7, 7A:
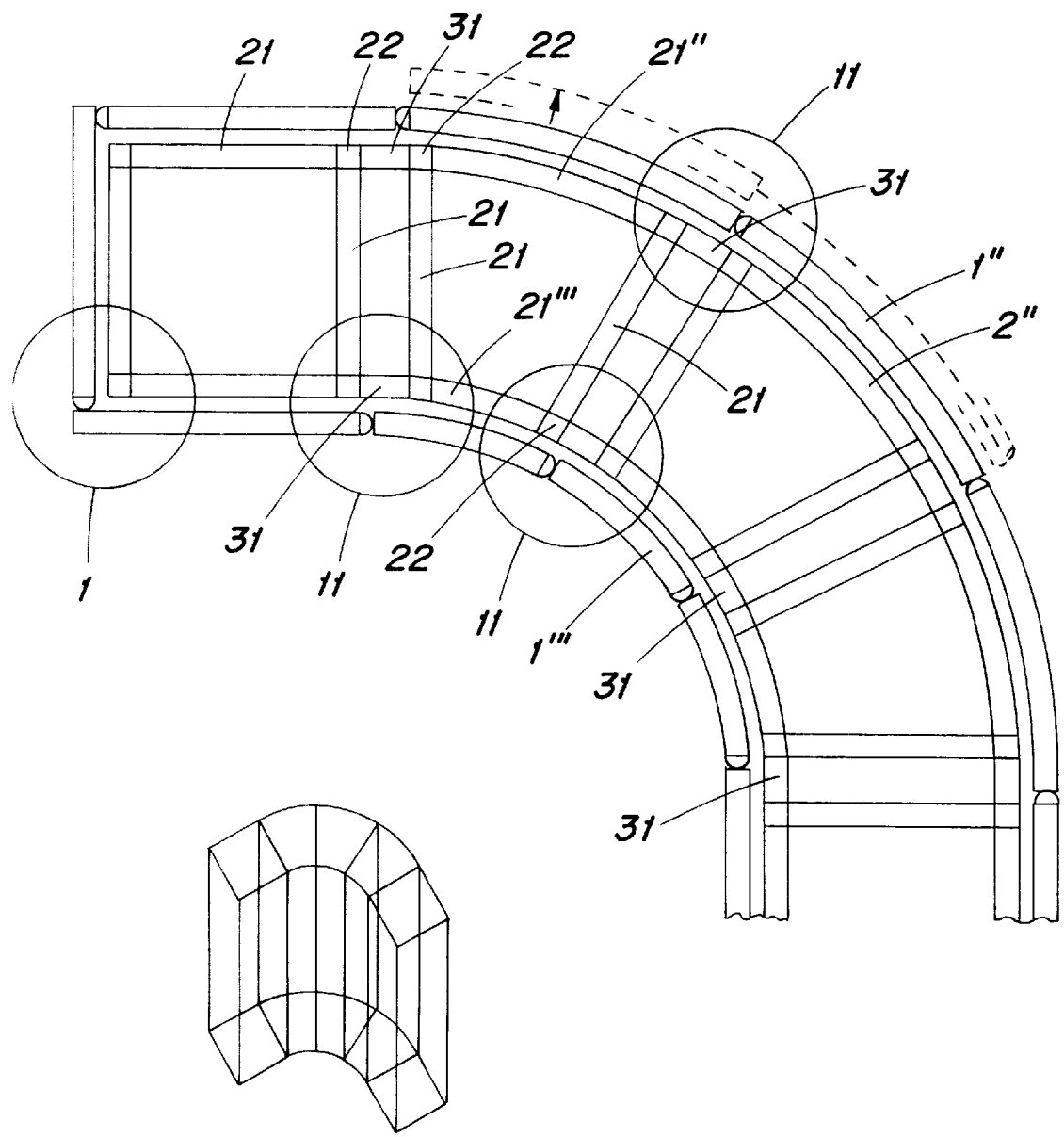

FIG. 7 represents a horizontal sectional view of a setup completed by arch-formed 30° frame and glass panel segments.

FIG. 7a is their axonometrical view.

In FIG. 8 is shown a horizontal sectional view of a variable partition wall with a possibility of interconnecting individual chambers.

FIG. 8a is its axonometrical view.

Figure 9:
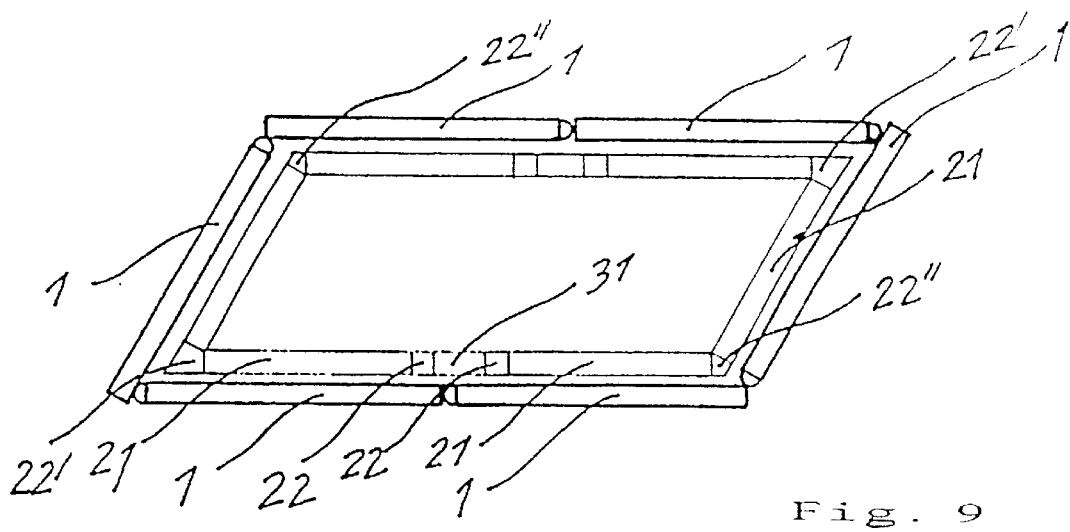

In FIG. 9 is a horizontal sectional view of an assembly composed of rhombic modules.

Figure 10:
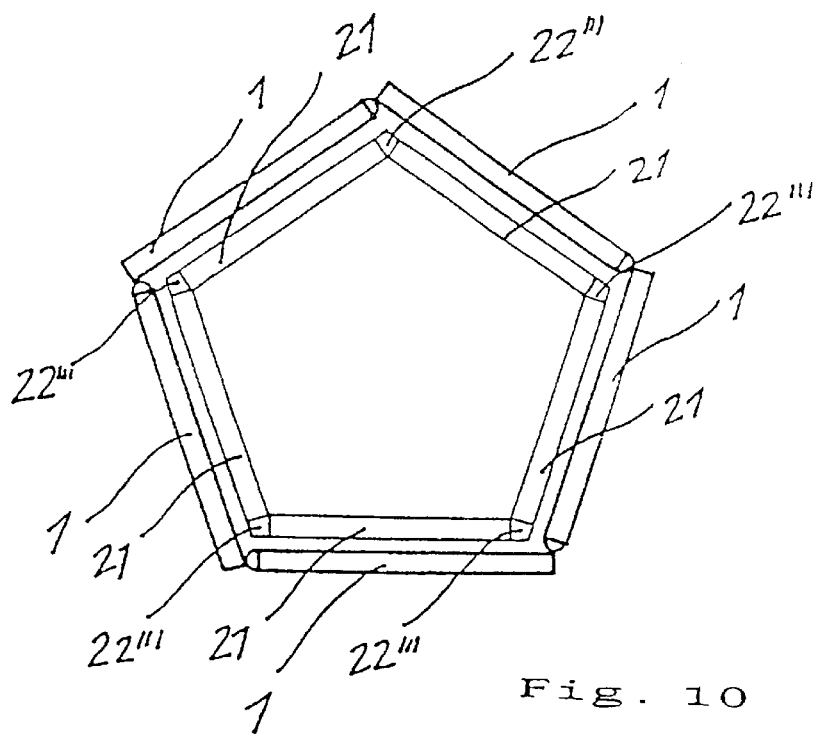

FIG. 10 is a horizontal view of a pentagonal module.

Figure 10A:
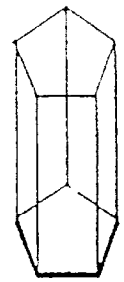

FIG. 10a shows an axonometrical view of a pentagonal module.

DETAILED DESCRIPTION OF THE PREFERRED EMBODIMENTS

Figure 1:
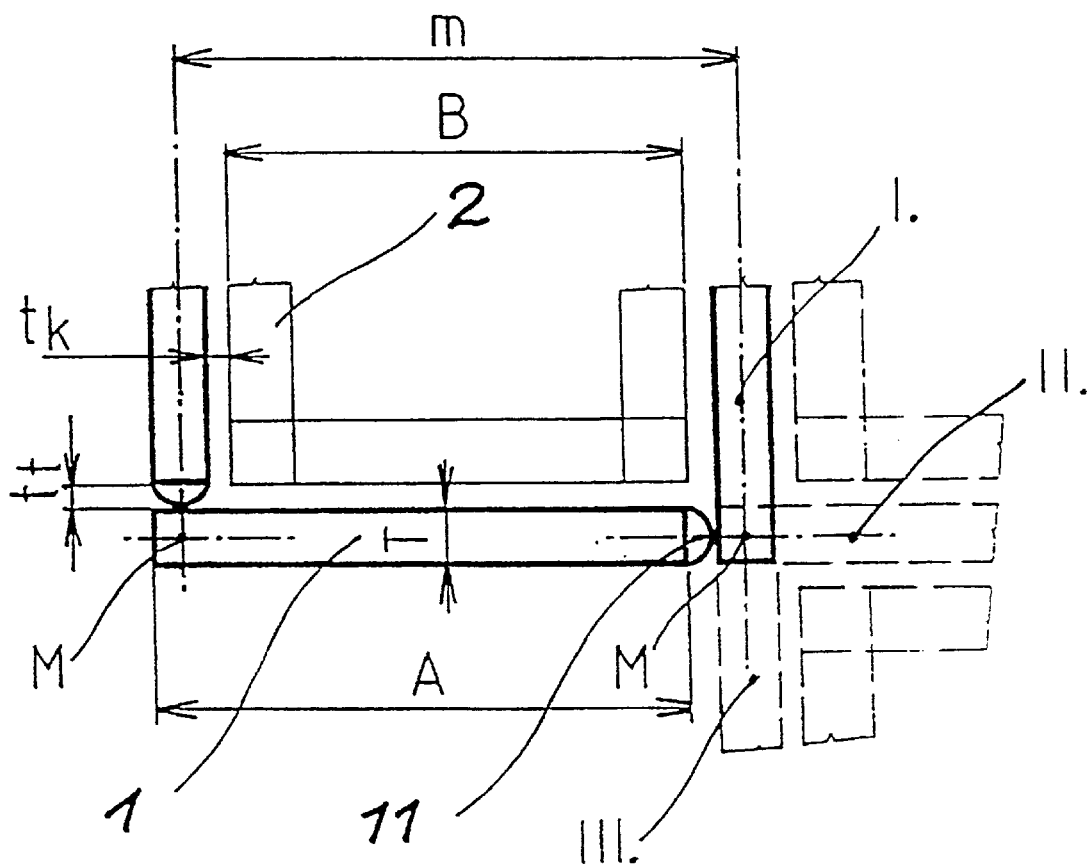
FIG. 1 shows a horizontal sectional view of a part of a display case module.

The invention enables to form any display case assembly. The possibility of forming an outer as well as an inner corner/edge joint is shown in FIG. 1. Marked by dimensions are the width A of a glass panel 1 and the outer width B of the frame 2. The panel 1 is situated at a design distance $t_k$ from the frame 2. The glass panel 1 thickness is T and the seal 11 thickness is $t_r$.

The relationship $A=B+T-t_r+2t_k$ enables to compose any combination of unified modular elements. The axis intersections M of individual glass panels constitute a modular network. The distances m between individual intersection points M are given by a relationship $m=A+t_r$. It is preferable when $t_k=t_r$.

The alternatives I, II and III mark individual possibilities of connecting the glass panels.

The alternative I is for an outer edge, II—for straight joint and III for inner fillet.

EXAMPLE 1

FIG. 2 shows a single-module display case with marking of the detail I—an outer edge. The frame 2 is rectangular in plane. At a distance of $t_k$ from the frame are positioned glass panels 1, one vertical edge of each of them being fitted with a seal 11. The width A of the glass panel 1=frame width $B+2t_k-t_r$. The thickness of the seal $t_r==$ the design dimension $t_k$ and thence $A=B+t_k=B+t_r$. Each of the panels can be pushed forward and shifted aside in order to open the display case.

EXAMPLE 2

FIG. 3 shows a four-module assembly. The module frames 2 are interconnected in the edges between modular connecting members 31. The module frame 2 is composed of carrying frame sections 21, which are interconnected by a corner connecting member 22. The details I, II and III show a straight joint of glass panels, building-up of an outer edge and an inner corner. Dashed lines show pushing forward of a glass panel 1 and its shifting aside over the adjacent closed glass panel 1. FIG. 3b shows the detail II in greater detail (without the glass panels). Each end of the carrying section frame has a protrusion or lock that can be rigidly connected with a corresponding groove in the vertical side surfaces of a corner connecting member 22. Similarly, each end of the intermodule connecting member 31 has a protrusion or lock that can be rigidly connected with a corresponding groove in the vertical side surfaces of the corner connecting member 22.

EXAMPLE 3

A display case can be built with a square plane from four modules, as shown in FIG. 4. To make the display case more rigid, when the load capacity should be increased owing to a heavy mass of exposed objects, one inner panel 1 is added to the peripheral glass panels 1. Individual module frames 2 are interconnected by an intermodular connecting member 31. The joints of the panels on outer edges are marked I, a straight joint is marked II and a joint of two peripheral glass panels with an inner glass panel is marked as the alternative IV.

EXAMPLE 4

FIG. 5 shows a sectional view of an upper and of a bottom frame section 21 with a glass panel 1. The bottom carrying frame section 21 is a part of the bottom module frame 2 and the upper carrying frame section 21 is a part of the upper module frame 2. A display case module cover 52 is connected to the upper module frame 2 and a display case module bottom 51 is connected to the bottom module frame 2.

EXAMPLE 5

FIG. 6 shows an L-plane assembly, composed of square and rectangular modules. As it may be seen from the figure, the inner parts of the module frames of individual modules can be left out, and the basic carrying sections can be directly interconnected by means of corner connecting members 21 and by means of intermodular connecting members 31. The reference marks without dashes mark the elements belonging to the square modules, whereas the reference marks with dashes belong to the rectangular modules. The corner and intermodular connecting members 22 and 31 are identical.

EXAMPLE 6

FIG. 7 shows an assembly of rectangular modules with added arch-formed glass panels 1' and 1'''. The panels 1', 1'' and 1''' are a portion of the surface of a rotational cylinder, corresponding to a 30° segment. The panels 1'' are connected with an upper and a bottom arched carrying frame by means of a section 21'' being an analogy of straight frame sections 21 or also with the actuating section 23'' and with supporting sections 24'' (not shown), forming a rectangular module frame 2''. The carrying frame sections 21'' and 21''' are connected over corner connecting members 22 with straight carrying frame sections 21 and with intermodular connecting members 31.

Supporting sections 24'' and 24''' and actuating sections 23'' and 23''' are similar to the straight supporting sections 24 and actuating sections 23 and are not presented in FIG. 7. They enable panels 1'' and 1''' to be opened.

EXAMPLE 7

FIG. 9 represents an assembly built up from rhombic modules 4—The assembly is constituted by equidimensional carrying frame sections 21, glass panels 1 and intermodule connecting members 31. A corner connecting member 22 have the form of a prism with a square base and a corner connecting member 22' and 22'' have the form of a prism with trapezoidal base.

EXAMPLE 8

FIGS. 10 and 10a show a pentagonal module. It consists of equidimensional carrying frame sections 21, glass panels 1 and corner connecting members 22''' in the form of a prism with a trapezoidal base.

EXAMPLE 9

Individual elements, from which various configurations of display cases can be assembled, can also be used for composition of variable glass partition walls, as demonstrated in FIG. 8. The walls are constituted by straight or by arched carrying frame sections 21, to which glass panels 1 are fastened by glueing or over actuating and supporting sections or their arched analogues. The said elements are interconnected by means of intermodular and corner connecting members. Individual glass panels can be pushed forward and shifted aside over their adjacent panel.

Also a panel enclosing the space of showcases, loggias or entrance rooms can be built from said elements. Individual glass panels 1 can be pushed forward and then shifted aside and arranged behind each other. FIG. 8 also shows joints II, IV and V. In the case of joint V two glass panels 1 fitted with seals are pressed onto a third glass panel 1 opposite each other from both sides of the third glass panel 1.

The invention can be used for the production of glass display cases for museum and exhibition purposes, in the building and furniture industries.

What is claimed is:

1. A display case, comprising:

at least two adjacent modules, each said module including an upper frame support and lower frame support, each said frame support including carrying frame sections and corner connecting members, said carrying frame sections being adapted to be rigidly connected to said corner connecting members, at least one glass panel disposed between the upper frame support and lower frame support of each module on said carrying frame sections at least one intermodule connecting member for interconnecting adjacent modules, said at least one intermodule connecting member being adapted to be rigidly connected to corner connecting members of said adjacent modules;

said corner connecting members being formed as a prism and having grooves on vertical surfaces for engagement with protrusions contained on said carrying frame sections or said at least one intermodule connecting member;

wherein only one vertical side edge of one of said at least one glass panel is fitted with a seal which is in contact with the other of said at least one glass panel.

2. The display case assembly according to claim 1, wherein the side edge of the panel fitted with the seal is in contact with a vertical wall of the adjacent glass panel.

3. The display case assembly according to claim 1, wherein the side edge of the panel fitted with the seal is in contact with a vertical side edge of the adjacent glass panel.

4. The display case assembly according to claim 1 further comprising modules with a paralellipipedical base, a module having a module frame and at least one glass panel, and the wall width A of the glass panel is defined by the relationship $A=B+T-t_t+2t_k$ B being the outer dimension of the module frame in horizontal plane running through the glass panel and the module frame T the thickness of the glass panel $t_t$ the thickness of the seal $t_k$ the design distance from the module frame to the glass panel.

5. The display case assembly according to claim 1, wherein the modules having a rectangular plane base comprise at least two identical glass panels and of at least two equidimensional carrying frame sections and of identical corner connecting members.

6. The display case assembly according to claim 1, wherein the modules with a square plane base comprise identical glass panels and of equidimensional carrying frame sections and of identical corner connecting members.

7. The display case assembly according to claim 1, wherein the modules with rhombic plane base comprise identical glass panels and of equidimensional carrying frame sections.

8. The display case assembly according to claim 1, wherein the area of the glass panel is arched and that the glass panel so shaped is connected with an upper and/or with a bottom rounded carrying frame section.

9. The display case assembly according to claim 1, wherein the carrying frame section along its whole length an actuating section with freedom of shifting or tilting is inserted, on the whole length of which a supporting section with freedom of motion is fitted and is rigidly connected with an extendable vertical glass panel.

* * * * *